(12) United States Patent
Imai

(10) Patent No.: US 8,666,191 B2
(45) Date of Patent: Mar. 4, 2014

(54) SYSTEMS AND METHODS FOR IMAGE CAPTURING

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 13/038,603

(22) Filed: Mar. 2, 2011

(65) Prior Publication Data
US 2012/0224787 A1 Sep. 6, 2012

(51) Int. Cl.
*G06K 9/40* (2006.01)

(52) U.S. Cl.
USPC .......................................... 382/274

(58) Field of Classification Search
USPC ......... 382/103, 162, 164, 154, 256, 274, 284, 382/294; 345/426, 582, 629; 348/261, 266, 348/210.99, 222.1
See application file for complete search history.

(56) References Cited

U.S. PATENT DOCUMENTS

| | | | |
|---|---|---|---|
| 6,781,591 B2 * | 8/2004 | Raskar | 345/582 |
| 6,891,966 B2 * | 5/2005 | Chen | 382/145 |
| 6,912,313 B2 * | 6/2005 | Li | 382/219 |
| 7,085,409 B2 * | 8/2006 | Sawhney et al. | 382/154 |
| 7,352,393 B2 | 4/2008 | Sakamoto | |
| 7,595,823 B2 | 9/2009 | Yen | |
| 7,676,081 B2 * | 3/2010 | Blake et al. | 382/164 |
| 7,809,192 B2 | 10/2010 | Gokturk | |
| 2004/0085330 A1 | 5/2004 | Walker | |
| 2005/0180657 A1 * | 8/2005 | Zhang et al. | 382/294 |
| 2006/0120623 A1 | 6/2006 | Tsukamoto | |
| 2006/0239676 A1 * | 10/2006 | Parulski et al. | 396/287 |
| 2006/0285747 A1 * | 12/2006 | Blake et al. | 382/180 |
| 2007/0109411 A1 | 5/2007 | Jung | |
| 2007/0269119 A1 | 11/2007 | Hyerle | |
| 2009/0297061 A1 * | 12/2009 | Mareachen et al. | 382/285 |
| 2010/0241658 A1 | 9/2010 | Rathurs | |
| 2011/0234590 A1 * | 9/2011 | Jones et al. | 345/426 |

OTHER PUBLICATIONS

Park et al, Image-Based Relighting of Moving Objects with Specular Reflection, ICIAP 2005, LNCS 3617, pp. 519-526, 2005.*
Guan et al, Image Relighting and Matching With Illumination Information, Image Processing (ICIP), 2012 19th IEEE International Conference o, Oct. 3 2012.*

(Continued)

*Primary Examiner* — Andrae S Allison
(74) *Attorney, Agent, or Firm* — Canon U.S.A., Inc. IP Division

(57) ABSTRACT

Systems and methods for generating an image determine scene information based on a first image of a scene, the first image including an image of a subject at a first position in the scene, and the first image information including a first field of view of the first image and a first capture location where the first image was captured, acquire a second image of the scene from a repository storing a plurality of images based on the scene information, the second image having a second field of view similar to the first field of view and a second capture location similar to the first capture location, adjust light parameters of the image of the subject based on the light parameters of the second image, and generate a combined image based on the second image and the image of the subject, the combined image including at least part of the second image, and the adjusted image of the subject at a position in the scene similar to the first position in the scene.

11 Claims, 6 Drawing Sheets

(56) References Cited

OTHER PUBLICATIONS

Akers et al, Conveying Shape and Features with Image-Based Relighting, VIS '03 Proceedings of the 14th IEEE Visualization 2003 (VIS'03).*

Haber, T.; Fuchs, C.; Bekaer, P.; Seidel, H. -P; Goesele, M.; Lensch, H., "Relighting objects from image collections," Computer Vision and Pattern Recognition, 2009. CVPR 2009. IEEE Conference on , vol., no., pp. 627,634, Jun. 20-25, 2009.*

Jhuo et al., "Scene Location Guide by Image Based Retrieval", 2010.

Hua et al., "Automatic Annotation of Location Information for WWW Images", 2005.

Hays et al., "Scene Completion Using Millions of Photographs", Computer Graphics Proceedings, Annual Conference Series, 2007.

* cited by examiner

600

610

620

630

640

650

SYSTEMS AND METHODS FOR IMAGE CAPTURING

BACKGROUND

1. Field of the Disclosure

The present disclosure relates generally to image capturing.

2. Description of the Related Art

Because travel can be difficult, expensive, or time consuming, many consumers visit a particular location only once and for a very limited time. Thus, these consumers do not have time to wait for preferred image capturing conditions (e.g., a blue sky, a sunset, no rain, daylight, night, no fog, no snow) or the opportunity to return when conditions are preferable. Furthermore, these consumers often have a predetermined ideal image of the scene, such as an image found on a postcard, and they would like to capture this ideal image of the scene, rather than capture an image of how the scene appears while the consumers are physically present at the scene. Also, these consumers often desire to include themselves, friends, or family in the ideal images.

For example, consumers traveling to Yosemite National Park often have a desire to capture an image of the Tunnel View that shows El Capitan, Half Dome, and Bridalveil Falls in preferred conditions. However, on a foggy day the consumers' desire would be frustrated with the view partially or completely obscured. Or consumers traveling to Mount Rainier often have a desire to capture an image of the mountain on a clear day, but this desire is often frustrated by the frequently overcast sky in the area. Additionally, these consumers may not be able to wait for better conditions at Yosemite National Park or Mount Rainer and may not be able to return later.

Furthermore, though image processing allows the manipulation of color, brightness, contrast, and sharpness in captured images, the manipulated images must have a minimum image quality that is limited by the image capturing conditions, and the manipulation cannot restore most of the lighting information that was lost. Moreover, infra-red technology in some high-end imaging systems can remove fog and cloud, but these systems are designed to enhance visibility and not image quality, and the information captured from the scene (e.g., colors, levels of illumination, spatial resolution) using infra-red light will be different than the information captured from the scene using visible light and may not correlate well to visible images. For example, green foliage that is dark green under visible light becomes white because foliage reflects lots of infra-red energy. On the other hand, water and blue sky absorb lots of infra-red energy and, accordingly, appear dark. Thus, consumers may not be able to capture or create an ideal image of a scene even using image processing and an infra-red image.

SUMMARY

In one embodiment, a method for generating an image comprises determining scene information based on a first image of a scene, the first image including an image of a subject at a first position in the scene, and the first image information including a first field of view of the first image and a first capture location where the first image was captured, acquiring a second image of the scene from a repository storing a plurality of images based on the scene information, the second image having a second field of view similar to the first field of view and a second capture location similar to the first capture location, adjusting light parameters of the image of the subject based on the light parameters of the second image; and generating a combined image based on the second image and the image of the subject, the combined image including at least part of the second image and the adjusted image of the subject at a position in the scene similar to the first position in the scene.

In one embodiment, a system for generating an ideal image comprises a computer readable memory, a network interface configured to communicate with one or more other computing devices, and one or more processors configured to cause the system to determine a capture location of a first image of a scene, the first image including a foreground image of a subject at a first position in the scene, select a second image of the scene having a capture location within a predefined range of the capture location of the first image, relighting the foreground image of the subject based at least on the lighting in the second image, and generate a combined image, the combined image including the second image and the relighted foreground image of the subject at a position in the scene similar to the first position in the scene.

In one embodiment, one or more computer-readable media store instructions that, when executed by one or more computing devices, cause the one or more computing devices to perform operations comprising acquiring one or more images of a scene based on an initial image of the scene, wherein the initial image of the scene includes an image of a foreground subject, generating a relighted image of the foreground subject based on lighting parameters of the one or more images of the scene and the image of the foreground subject, and generating a combined image based on the one or more images of the scene and the relighted image of the foreground subject, wherein the combined image includes the relighted image of the foreground subject and portions of the one or more images of the scene.

DETAILED DESCRIPTION

Figure 1:
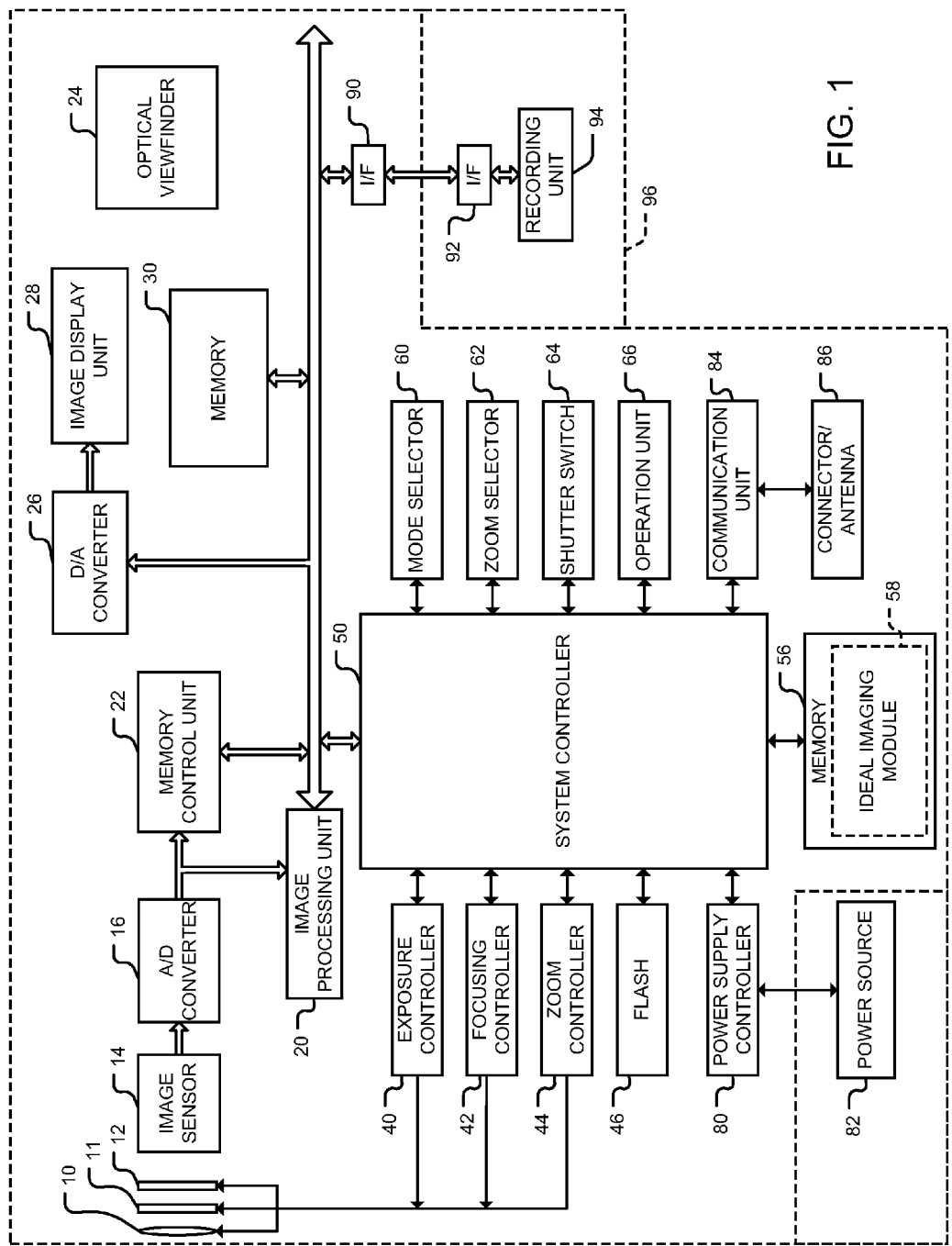
FIG. 1 illustrates an embodiment of an ideal imaging device.

The following description is of certain illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein FIG. 1 illustrates an embodiment of an ideal imaging device. The ideal imaging device acquires an image of a scene (e.g., captures the images, receives it from another device) and determines if the image of the scene includes any foreground subjects. If the image has foreground subjects, the ideal imaging device extracts the foreground subjects. The ideal imaging device acquires another image of the scene that has attributes that satisfy certain criteria (for example, weather conditions, illumination levels, illumination direction, color balance, etc.) and relights the extracted foreground subjects based on the lighting parameters of the other image. The ideal imaging device then combines the other image and the relighted foreground subjects, and the respective positions in the scene of the foreground subjects in the combined image is identical or almost identical to the respective positions in the scene of the foreground subjects in the captured image. Thus, the combined image may appear as if the foreground subjects were captured in an image while in the same respective positions in the scene as shown in the captured image and while in the weather and lighting conditions of the other image.

The ideal imaging device includes a lens 10 (which may include a plurality of lenses, including a microlens array), an aperture 11 (which may include a plurality of apertures), a shutter 12, and a light sensor 14 that converts incident electromagnetic radiation (e.g., an optical image) into an electrical signal. Furthermore, in other embodiments the lens 10, aperture 11, and shutter 12 may be arranged differently than is shown in the embodiment of FIG. 1. Electromagnetic radiation (also referred to herein as "light") from a scene (e.g., reflected from objects in the scene) passes through the lens 10, the aperture 11, and the shutter 12, when open, and forms an image on an light sensing surface of a light sensor 14. The light sensor 14 converts the light to analog image signals and outputs the signals to an ND converter 16. The ND converter 16 converts the analog image signals to digital image signals.

The light sensor 14 can detect light in the spectrum visible to the human eye and/or in the spectrum that the human eye cannot detect (e.g., infrared, x-ray, ultraviolet, gamma rays). In some embodiments, the light sensor 14 is a plenoptic light sensor and is capable of detecting light fields (e.g., 4 dimensional light fields). The imaging sensor 14 may have a spectral response that is tunable by adjusting one or more capture parameters and/or may have one or more tunable filters. The tunable imaging sensors and/or tunable filters may be adjusted with spatial masks, global tuning, regional tuning, pixel-by-pixel tuning, and temporal tuning.

The ideal imaging device also includes an image processing unit 20, which applies resize processing, such as predetermined interpolation and reduction, and color conversion processing to data received from the ND converter 16 or from the memory control unit 22. The image processing unit 20 performs predetermined arithmetic operations using the captured image data, and the ideal imaging device can perform exposure control, ranging control, TTL (through-the-lens) AF (auto focus) processing, AE (auto exposure) processing, EF (flash pre-emission) processing, and TTLAWB (auto white balance) operations based on the obtained arithmetic result.

Output data from the ND converter 16 is written to a memory 30. The memory 30 is configured to image data (e.g., still photos, videos) that is captured by the light sensor 14 and converted into digital data by the A/D converter 16. The memory 30 is configured to store other data as well, for example metadata and file headers for captured images. The memory 30 may also serve as an image display memory. A D/A converter 26 converts digital data into an analog signal and supplies that analog signal to an image display unit 28. The image display unit 28 renders images according to the analog signal from the D/A converter 26 on a display (e.g., an LCD display, an OLED display, a LED display, a plasma display).

An exposure controller 40 controls the shutter 12 and or the aperture 11. The exposure controller 40 may also have a flash exposure compensation function that links with a flash 46. The flash 46 has an AF auxiliary light projection function and a flash exposure compensation function. A focusing controller 42 controls the focus of the lens 10, and a zoom controller 44 controls the angle of view of the lens 10. The exposure controller 40, the focusing controller 42, and the zoom controller 44 may each partially control the lens 10, aperture 11, and shutter 12, and may collaborate with each other to determine appropriate settings for the lens 10, the aperture 11, and the shutter A memory 56 (as well as the memory 30) is a readable and writable memory, and may be any computer readable medium that can store information, including for example, for example, a semiconductor memory (e.g., flash memory, SRAM, DRAM), a magnetic disc (e.g., hard disk, a floppy disk), an optical disc, etc. The memory 56 may store computer-executable instructions and data for use by a system controller 50. The system controller 50 includes one or more processors (e.g., microprocessors) and reads and performs computer-executable instructions, such as instructions stored in the memory 56. Note that the computer-executable instructions may include instructions for the performance of various methods described herein.

The memory 56 includes an ideal imaging module 58. A module includes instructions that may be executed by the ideal imaging device to cause the ideal imaging device to perform certain operations, though for ease of description a module may be described as performing the operations. Modules may include logic and/or computer readable instructions and may be implemented in software (e.g., Assembly, C, C++, C#, Java, BASIC, Perl), firmware, and/or hardware. In other embodiments, the ideal imaging device may include more or less modules, the modules may be combined into fewer modules, or the modules may be divided into more modules. The ideal imaging module 58 may be executed by the ideal imaging device to perform the methods described herein.

The ideal imaging device also includes a mode selector 60 that sets the operation mode of the ideal imaging device to still image recording mode, movie recording mode, playback mode, etc. A zoom selector 62 may be operated by a user to change the angle of view (zooming magnification or shooting magnification). The zoom selector 62 may include a slide-type member, a lever, and/or a switch.

The shutter switch 64 may be activated in the middle of operation (half stroke) of a shutter button, and generate a first shutter switch signal. Also, the shutter switch 64 may be activated upon a full stroke of the shutter button and generate a second shutter switch signal. The system controller 50 may start the operations of the AF (auto focus) processing, AE (auto exposure) processing, AWB (auto white balance) processing, EF (flash pre-emission) processing, and the like in response to the first shutter switch signal. Also, in response to the second shutter switch signal, the system controller 50 may perform and/or initiate a series of operations, including the following: reading image signals from the light sensor 14, converting image signals into image data by the ND converter 16, processing of image data by the image processor 20, writing image data to the memory 30, reading image data from the memory 30, compression of the image data, and writing data to the recording medium 96.

The operation unit 66 may include various buttons, touch panels and so on. In one embodiment, the operation unit 66 includes a menu button, a set button, a macro selection button, a multi-image reproduction/repaging button, a single-shot/serial shot/self-timer selection button, a forward (+) menu selection button, a backward (−) menu selection button, and the like. The operation unit 66 may also set and change the flash operation mode. The settable modes include auto, flash-on, red-eye reduction auto, and flash-on (red-eye reduction). The operation unit 66 may be used to select a storage format for the captured image information, including JPEG (Joint Photographic Expert Group) and RAW formats. The operation unit 66 may set the ideal imaging device to a plural-image shooting mode, wherein data from a plurality of images data can be recorded in response to a single shooting instruction by a user. This may include auto bracketing, wherein one or more shooting parameters (e.g., white balance and exposure) are altered in each of the images.

A power supply controller 80 detects the existence/absence of a power source, the type of the power source, and a remaining power level, and supplies a necessary voltage to other components as required. A power source 82 includes, for example, a battery, such as an alkaline battery, a lithium battery, a NiCd battery, a NiMH battery, and an Li battery, and an AC adapter.

The recording media 96 includes a recording unit 94 that includes computer readable media and an interface 92 for communication with the ideal imaging device. The interface 92 is coupled to interface 90 of the ideal imaging device. Although the illustrated embodiment includes one interface 90 for connecting to the recording media 96, other embodiments may include more or less interfaces. The ideal imaging device also includes an optical viewfinder 24, which indicates the image that will be captured by the light sensor 14 and which may include a pentaprism.

Additionally, a communication unit 84 communicates with other devices, through channels such as USB, IEEE 1394, P1284, SCSI, modem, LAN, RS232C, serial cable, and wireless communication. A connector/antenna 86 can connect the ideal imaging device to other devices via a wired connection and/or communicate wirelessly with other computing devices.

Figure 2:
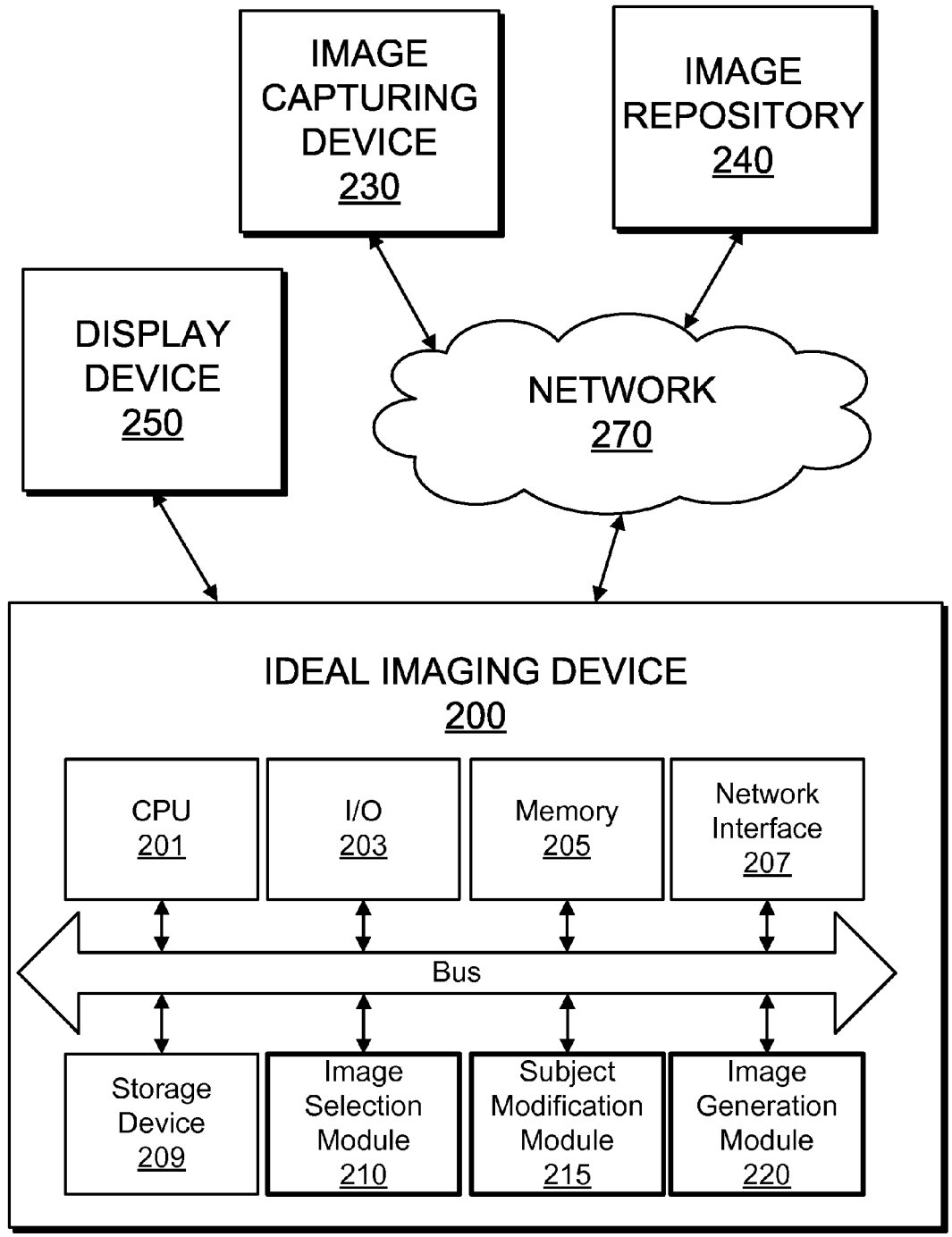
FIG. 2 illustrates an embodiment of an ideal imaging device in communication with a display device, an image capturing device, and an image repository.

FIG. 2 illustrates an embodiment of an ideal imaging device 200 in communication with a display device 250, an image capturing device 230, and an image repository 240. The ideal imaging device 200 communicates with the image capturing device 230 and with the image repository 240 via a network 270. The network 270 may include any combination of one or more networks, including the Internet, WANs, PANs, HANs, MANs, and LANs as well as any combination of wired or wireless networks. The ideal imaging device 200 can also communicate with the display device 250 via the network and communicate with the image capturing device 230 and/or the image repository 240 via a direct connection (e.g., serial port, USB, IEEE 1394, Ethernet, HDMI). The display device 250 is configured to render images on a display (e.g., a plasma display, LED display, OLED display, CRT display, DLP display, LCD display, a projector). The image capturing device 230 is configured to capture images of a scene. The image repository 240 is configured to store images and includes one or more storage devices and/or computing devices (e.g., desktop computers, servers, laptops, handheld computers, PDAs, Tablet PCs, mainframes, cell phones, image capturing devices) that may store hundreds, thousands, or millions of images. The image repository 240 may be associated with an image sharing service or web site, such a Flickr®, Picasa®, Photobucket®, etc.

The ideal imaging device 200 includes one or more processors 201 (also referred to herein as "CPU 201"), which may be conventional or customized microprocessor(s). The CPU 201 is configured to read and execute computer readable instructions, and the CPU 201 may command/and or control other components of the ideal imaging device 200.

The ideal imaging device 200 also includes I/O interfaces 203, which provide communication interfaces to input and output devices, including a keyboard, a display (e.g., the display device 250), a mouse, a printing device, a touch screen, a light pen, an optical storage device, a scanner, a microphone, a camera, a drive, etc. The ideal imaging device 200 additionally includes a memory 205, which includes one or more computer-readable media. The network interface 207 allows the ideal imaging device 200 to communicate with other computing devices via the network 270, and may have wired and/or wireless capabilities. The storage device 209 stores data or modules and may include, for example, a magnetic storage device (e.g., a hard drive), an optical storage device, and/or a solid state drive. The components of the ideal imaging device 200 are connected via a bus. The ideal imaging device 200 includes an operating system, which manages one or more of the hardware, the processes, the interrupts, the memory, and the file system.

The ideal imaging device 200 also includes an image selection module 210, a subject modification module 215, and an image generation module 220. The image selection module 210 acquires (e.g., searches for, requests, selects, identifies, receives) images of a scene. For example, in one embodiment the image selection module 210 sends one or more requests to the image repository 240, requesting images whose attributes satisfy certain criteria. Attributes may including, for example, capture location, image capturing device orientation, field of view, time of day, capture date, image size, spectral parameters, image resolution, image histogram, color histogram, color temperature, color balance, user rating, user preference, type of image capturing device, focal plane, depth of field, and any other attribute associated with an image. A request may include an initial image of the scene which may be used by the image repository 240 to identify the scene. The image repository 240 searches through the images stored in its storage devices and returns any image(s) whose respective attributes satisfy the criteria. If multiple images are returned, the image selection module 210 selects an image from the returned images based on the image attributes and the criteria and/or on one or more user selections of the returned images, which may be presented to a user via the display device 250.

The subject modification module 215 extracts one or more subjects from the initial image and relights the extracted subjects based on the lighting of the selected image(s). Relighting may include adjusting one or more of illumination, light angle, and color balance. In embodiments where the initial image is a computational image, the image includes more information than is included in an RGB image. The extra information may include depth information, spectral information, lighting information (e.g., diffuse, the direction of the light, the intensity of the light), and/or the nature of light (e.g., correlated color temperature), and the subject modification module 215 may use the extra information to extract any foreground subjects and/or relight any foreground subjects. The image generation module 220 combines relighted subjects and the selected image(s). The subjects are added to respective positions in the selected image that is identical to or substantially identical to their respective positions in the initial image. Thus, any subject(s) appear to have been captured in the selected image while in the same position(s) as in the initial image. For example, the selected image may be a new background for the subject(s), and any subjects are positioned in the same respective positions on the background. For example, an initial image includes a person standing in front of Mt. Rushmore and obstructing Teddy Roosevelt on a foggy day, and the combined image includes the person standing in Mt. Rushmore and obstructing Teddy Roosevelt on a clear day. The image generation module 220 may generate a lower resolution preview image and present it to a user via the display device 250 and/or wait to receive a user approval (e.g., via the I/O interface 203) before generating the final image.

Figure 3:
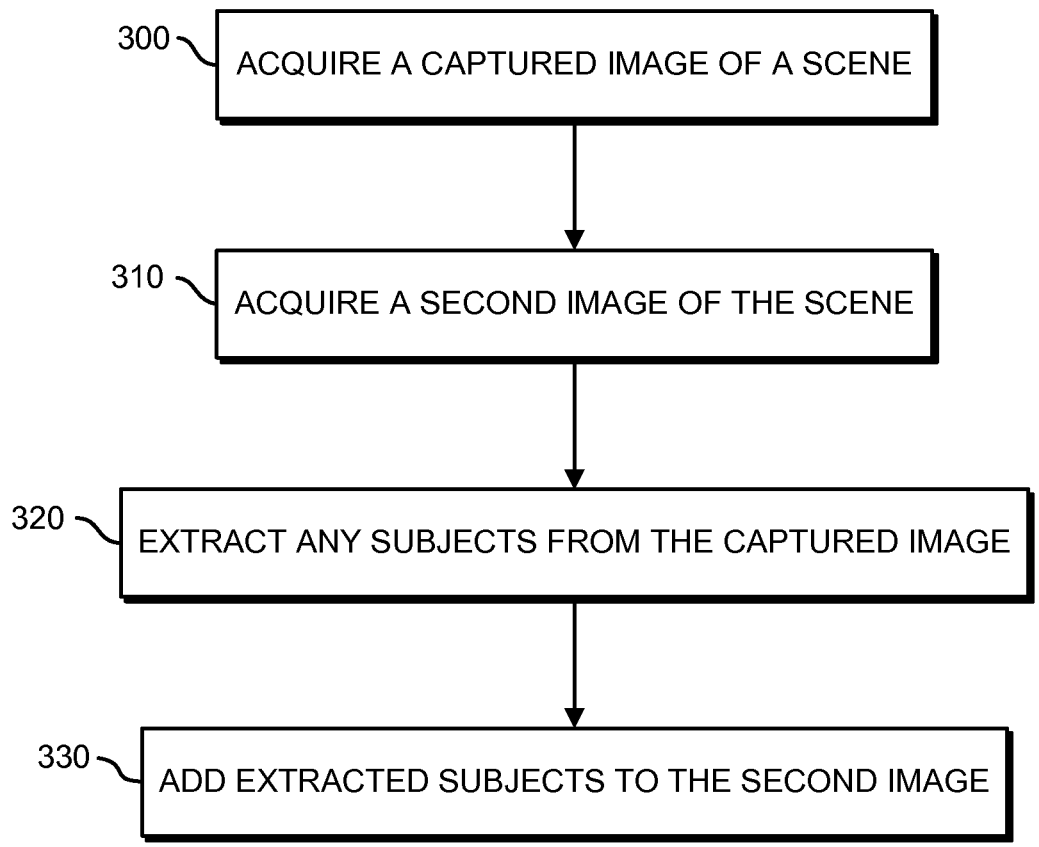
FIG. 3 is a block diagram that illustrates an embodiment of a method for generating an ideal image.

FIG. 3 is a block diagram that illustrates an embodiment of a method for generating an ideal image. Other embodiments of this method and the other methods described herein may omit blocks, may add blocks, may change the order of the blocks, may combine blocks, and/or may divide blocks into separate blocks. Additionally, one or more components of the ideal imaging device (including, for example, the ideal imaging module 58, the image selection module 210, the subject modification module 215, and the image generation module 220) may implement the method shown in FIG. 3 and the other methods described herein.

First, in block 300, a captured image of a scene is acquired. The image of the scene may be acquired via a light sensor, or the captured image may be acquired from an image capturing device, another devices that stores the captured image (e.g., an image repository), or a computer readable medium that stores the captured image. The captured image may be a computational photographic image of the scene. The image of the scene may be acquired passively (e.g., another device may send the image) or actively (e.g., the image may be requested, a capture command may be sent to an image sensor).

Moving to block 310, a second image of the scene is acquired, either passively or actively. The second image may be acquired from a device that stores captured images, for example an image repository. Acquiring the second image may include sending a request that indicates one or more criteria of a second image and/or includes the captured image. Additionally, the second image may be acquired by searching a computer readable medium (e.g., magnetic memory (including a hard drive, a floppy drive, and a magnetic tape), solid state memory (including flash based memory and volatile memory), optical disc (including CD, DVD, and Blu-ray)) for stored images, identifying images whose respective attributes satisfy the one or more criteria, and/or identifying images similar to the captured image. For example, criteria may include a predetermined range of distances to a capture location of the image capturing device that captured the image (e.g., within 1 foot, 3 feet, 10 feet, or 20 feet of a specified location), a camera orientation within a predetermined range (e.g., a compass heading within 005° of N(000°) and a tilt of 31°-34°, a compass heading of 090° (east) and a tilt of 10°-18°, a compass heading within 008° of 277° and a tilt of −2°−−11°, and/or a field of view within a predetermined range (e.g., 55°-56° horizontal and 38°-39° vertical, 73.5°-74° horizontal and 52.8°-53.4° vertical, 15.0°-15.4° horizontal and 10.2° vertical, 86° horizontal and 64°-70° vertical). The criteria may also include a user rating, color parameters (e.g., an amount of blue, green, or red, color intensity, color saturation), a date, a time of day, and any other attribute associated with an image.

For example, the weather history at a location may be retrieved, for example from a database, and the dates and times of capture of respective images can be compared with the weather at the location where the images were captured to identify images that were captured during preferable weather. Additionally, the time of image capture can be compared with the sunrise/sunset times at the location of the image capture and/or preferred image capture times at the location. Also, images can be compared with user preferences for image attributes (e.g., time of day, color saturation levels, color balance, brightness). The images may be ranked based on the criteria. Moreover, the captured image of a scene or a lower resolution version of the captured image may be sent with a request for an image and/or optically compared with other images in order to locate other images of the scene. Furthermore, images may also be presented to a user, for example all returned images, images that satisfy certain criteria, and the highest ranked images based on certain criteria. A selection of the user may then be received to determine the second image.

Moving to block 320, any foreground subjects are extracted from the captured image. Subjects may be identified using the depth information or the spectral information in the images. This may be facilitated by the extra information included in computational photographic images, which include more depth and spectral information than RGB images. Moving to block 330, the extracted subjects are added to the second image. The subjects may be relighted to more closely match the lighting in the second image. For example, if the captured image was captured on a cloudy day and the second image was captured on a cloudless day at noon, the extracted subject may be relighted to appear more like the subject would on a cloudless day at noon. In some embodiments, the second image provides the background of the foreground subjects. Additionally, the subject is added to the scene in the second image at a position similar to or identical to the position of the subject in the scene in the captured image. For example, if the subject is positioned in the center of the scene in the captured image the subject is added to the center of the scene in the second image. Thus, the final image may appear as if the subjects were captured in an image of the scene while the subjects were in the same position in the scene as shown in the captured image and while the subjects were in the weather and lighting conditions of the second image.

In some embodiments, rather than use the scene as a point of reference, an image itself may be used as the point of reference (e.g., X,Y coordinates relative to a corner of the first image). Therefore, the subject may be positioned in the second image at a position identical to or almost identical to the position of the subject in the first image relative to a reference point (e.g., a lower left corner of each image), though depending on the second image, this position of the subject in the second image may or may not be identical to or almost identical to the position of the subject in the scene in the first image. For example, if the second image of the scene is shifted slightly to the left of the first image of the scene, a subject positioned in the second image relative to the image itself (e.g., same distance from the left edge of the image) may appear to be shifted slightly left in the scene relative to the position of the subject in the scene in the first image.

Figure 4:
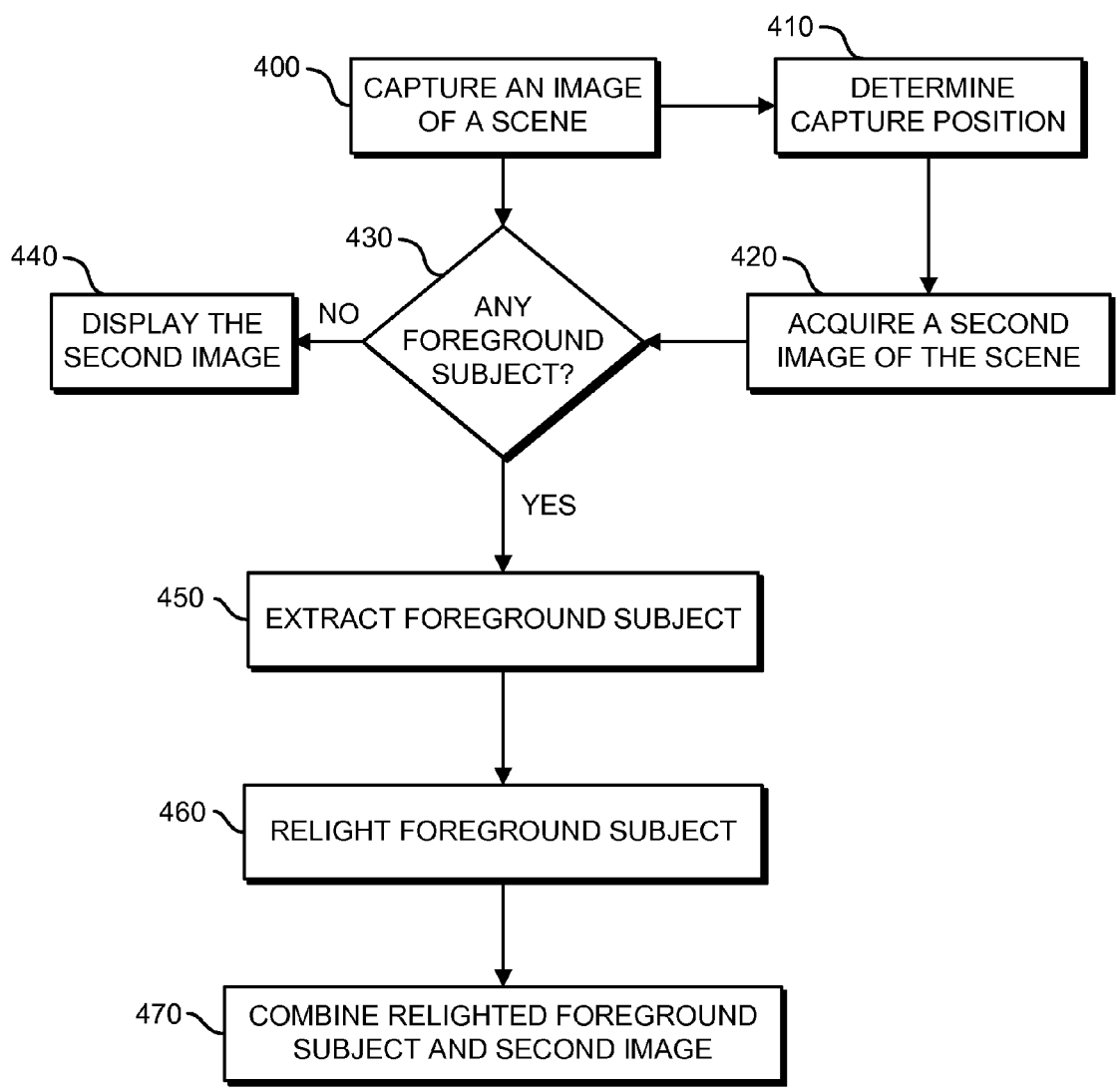
FIG. 4 is a block diagram that illustrates an embodiment of a method for generating an ideal image.

FIG. 4 is a block diagram that illustrates an embodiment of a method for generating an ideal image. Starting in block 400, an image of a scene is captured. Next, in block 410, the capture position (including capturing device location and orientation) is determined. The capture position may be determined based on GPS indicators on the image (whether added by the image capturing device or the user), other metadata with the image (e.g., tags), optical recognition of the captured scene, etc. Moving to block 420, a second image of the scene is acquired, for example by sending a request to a computing device and/or searching for other images of the scene (e.g., on a computer-readable medium that stores images). The second image of the scene may have image attributes that satisfy one or more criteria (e.g., match the criteria, fall within a range specified by the criteria).

In block 430, the presence of any foregrounds subjects in the image is determined. If there are no foreground subjects, the second image is displayed in block 440. If there are one or more foreground subjects, in block 450 the foreground subjects are extracted. Next, in block 460 the foreground subject(s) is relighted, for example to better match the lighting of the second image. Finally, in block 470 the relighted foreground subject(s) is combined with the second image of the scene and positioned in the second image at the same or almost the same position in the scene as the subject's position in the scene in the first image.

Figure 5:
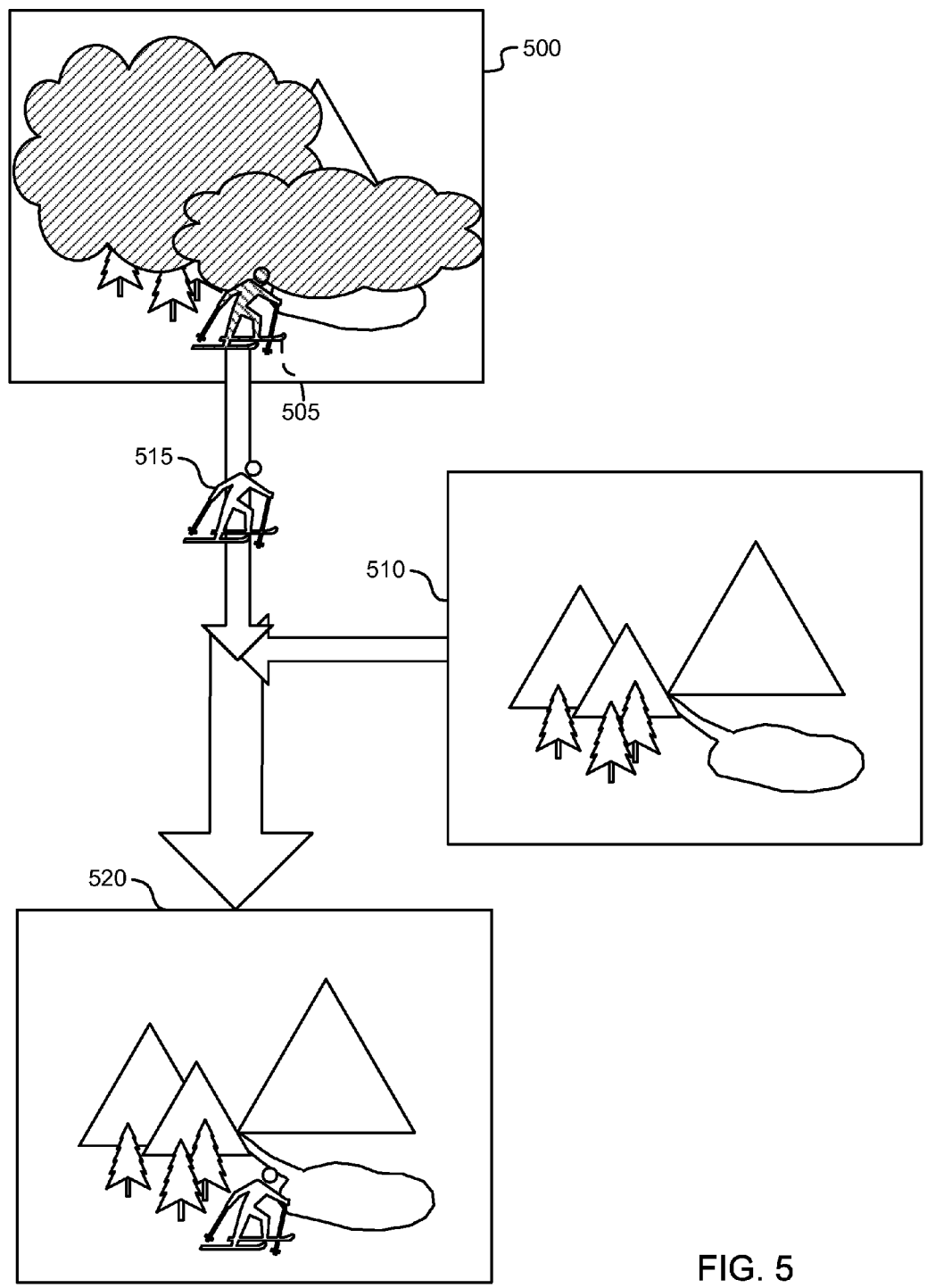
FIG. 5 illustrates an embodiment of the generation of an ideal image.

FIG. 5 illustrates one embodiment of the generation of an ideal image. FIG. 5 includes an initial image 500 of a scene, which includes a foreground subject 505. In this embodiment, the image includes clouds that partially obscure parts of the scene. A second image 510 of the scene is also illustrated. The second image 510 has different image attributes, including an unobstructed view of the scene. The foreground subject 505 is extracted from the initial image 500 and relighted based on the lighting parameters of the second image 510 to generate an extracted foreground subject 515. The extracted foreground subject 515 is combined with the second image 510 to generate a final image 520. The extracted foreground subject 515 is positioned in the same or almost the same location in the scene in the final image 520 as the foreground subject 505 is positioned in the scene in the initial image 500. Thus, in the final image 520 the subject may appear to have been captured while at that position in the scene while the scene appeared as the scene is shown in the second image 510.

Figure 6:
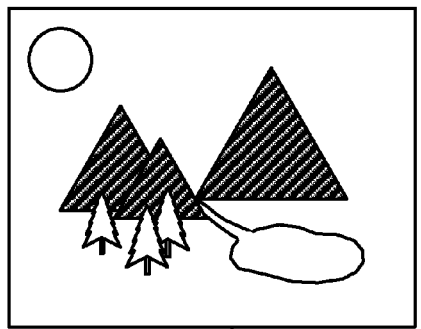
FIG. 6 illustrates an embodiment of images of a scene.
Figure 6:
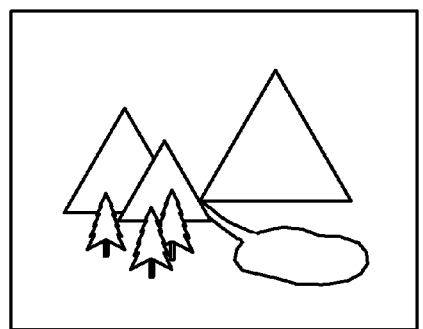
Figure 6:
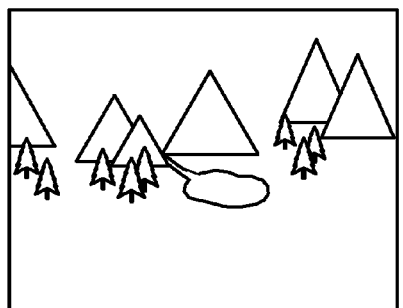
Figure 6:
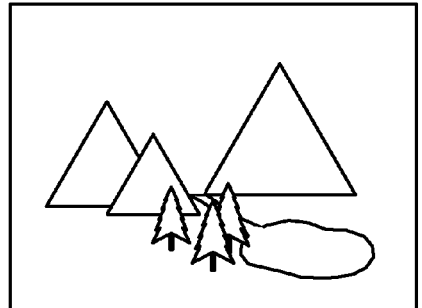
Figure 6:
Figure 6:
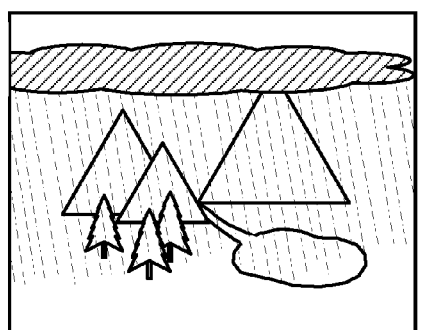

FIG. 6 illustrates an embodiment of images of a scene. A first image 600 was captured when parts of the scene were shadowed. Examples of attributes for the first image 600 include the following: time of capture is 6:59 pm, date of capture is April 23, location of capture (refers to the location of the image capturing device when it captured the image) is X=22, Y=33 (in this simplified example, X refers to left and right, Y refers to distance from the scene), field of view is 65.5° horizontal and 46.4° vertical, camera orientation is 270°, camera tilt is 6°, and user rating is 6/10. A second image 610 was captured on a cloudless day, and examples of attributes for the second image 610 include the following: time of capture is 11:43 am, date of capture is March 19, location of capture is X=21.3, Y=33.1, field of view is 65.5° horizontal and 46.4° vertical, camera orientation is 271°, camera tilt is 6.1°, and user rating is 9/10.

A third image 620 was also captured on a cloudless day, but with different attributes than the attributes of the second image 610, and examples of attributes for the third image 620 include the following: time of capture is 1:15 pm, date of capture is March 26, location of capture is X=22.2, Y=40.7, field of view is 81.2° horizontal and 59.5° vertical, camera orientation is 270°, camera tilt is 5.4°, and user rating is 6/10. Additionally, the third image 620 is a smaller size than the other images. A fourth image 630 was also captured on a cloudless day, but also further to the left than any of the other images, and examples of attributes for the fourth image 630 include the following: time of capture is 12:22 pm, date of capture is March 8, location of capture is X=11.6, Y=34, field of view is 65.5° horizontal and 46.4° vertical, camera orientation is 293°, camera tilt is 5.9°, and user rating is 8/10.

A fifth image 640 includes a foreground object, in particular a person, and the following are examples of attributes for the fifth image 640: time of capture is 10:40 am, date of capture is February 28, location of capture is X=22, Y=31, field of view is 65.5° horizontal and 46.4° vertical, camera orientation is 268.9°, camera tilt is 6°, and user rating is 4/10. Additionally, metadata associated with the fifth image 640 includes a tag of the person. A sixth image 650 that was captured on a rainy day includes the following attributes: time of capture is 12:01 pm, date of capture is March 15, location of capture is X=21, Y=31, field of view is 65.5° horizontal and 46.4° vertical, camera orientation is 270.3°, camera tilt is 6.15°, and user rating is 7/10.

In embodiments where an image is selected based at least in part on the highest user rating, the second image 620, which has the highest user rating, would be selected. If the selection of the image includes selecting a group of images having the highest user rating, for example three images (though the group may include 2, 4, 7, or any other number of images), then the second image 620, the fourth image 630, and the sixth image 650 would be selected, and the images may then be presented to a user and a user selection of an image may be received.

In embodiments where an image is selected based at least in part on weather history, the location, date, and time of capture of the different images may be used to determine the weather at the moment of capture. For example, the weather history on April 23, the date of capture of the first image 600, at the location of capture may be accessed (e.g., by a computing device that accesses a database of weather history, for example records maintained by the United States National Weather Service) to determine the weather conditions at the time that the first image 600 was captured. The weather history indicates that the sky was clear, but it also indicates the time of sunset, and comparing this time with the time of capture indicates that the first image 600 was captured near sunset. In some embodiments, the lighting of scene in the first image 600 does not satisfy the selection criteria because parts of the scene are too dark (though in other embodiments a time near sunset may satisfy the criteria). Also, for example, the weather history on March 15 at about noon, which are the date and time of capture of the sixth image 650, may be accessed to determine that the sixth image 650 of the scene includes rain.

If the images are selected based on the location of capture, the selection criteria may indicate an exact location or a location within a range of locations. For example, if the criteria require a capture location of X=22.2 and Y=31-33, then none of the images in FIG. 6 would be selected. However, if the criteria require an image with a location within 1 of X=22 and within 1 of Y=32, then the first image 600, the fifth image 640, and the sixth image 650 would be selected. These images may be presented to a user for selection.

Also, any combination of image attributes may be used as selection criteria. For example, the metadata and/or other tags may be used to determine if an image includes persons. Thus, continuing the above example of the selection of the first image 600, the fifth image 640, and the sixth image 650, the metadata that is associated with the fifth image 640 may be used to determine that the fifth image 650 includes a person, and, if the criteria require an image without a person, the fifth image 650 is not selected. By way of another example, the criteria may indicate an image that was captured on a cloudless day from 11:00 am to 2:00 pm, has a capture location within 1 of X=21.5 and within 0.5 of Y=33.5, a field of view that is within 0.1° of 65.5° horizontal and within 0.1° of 46.4° vertical, a camera orientation within 0.5° of 271°, and a camera tilt within 0.15° of 6°. Thus, the second image 610 would be selected based on these criteria. Additionally, selection may include different iterations of determining if images match certain criteria, with the subsequent iterations having one or more criteria that are changed (e.g., broader ranges, different attributes, more attributes, less attributes) from the criteria of the previous iteration(s). Also, increasing the number of images in the image repository or image repositories may increase the likelihood that an image that satisfies certain criteria will be found.

Furthermore, if the images in FIG. 6 are computational images, the extra information can be used to select an image. For example, the distance information in the fifth image 640 may be used to detect the presence of a foreground object in the image, which in turn may be used to reject the fifth image 640 from selection if an image without a foreground object is desired. Also, the distance information may be used to detect the greater distance between the image capturing device and the scene in the third image 620, which also may be used to determine if the third image satisfies any criteria. Additionally, the extra information may include more spectral information, which can be used to describe and evaluate more image attributes, for example in criteria, than is possible in an RGB image.

The above described systems and methods can be achieved by supplying one or more storage media having computer-executable instructions for realizing the above described operations to one or more computing devices that are configured to read the computer-executable instructions stored in the one or more storage media and execute them. In this case, computing devices perform the operations of the above-described embodiments when executing the computer-executable instructions read from the one or more storage media. Also, an operating system on the one or more computing devices may carry out part or all of the actual processing that realizes the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk and a hard disk), an optical disc (including a CD, a DVD, a Blu-ray disc), a magneto-optical disk, a magnetic tape, and a solid state drive (including flash memory, DRAM, SRAM) can be employed as a storage medium for the computer-executable instructions. The computer-executable instructions may be written to a computer-readable storage medium provided on a function-extension board inserted into the computing device or on a function-extension unit connected to the computing device, and a CPU provided on the function-extension board or unit may carry out part or all of the actual processing that realizes the operations of the above-described embodiments.

This disclosure has provided a detailed description with respect to particular illustrative embodiments. It is understood that the scope of the appended claims is not limited to the above-described embodiments, and that various changes and modifications may be made without departing from the scope of the claims.

What is claimed is:

1. A method for generating an image, the method comprising:

determining scene information based on a first image of a scene, the first image including an image of a subject at a first position in the scene, and the first image information including a first field of view of the first image and a first capture location where the first image was captured;

acquiring a second image of the scene from a repository storing a plurality of images based on the scene information, the second image having a second field of view similar to the first field of view and a second capture location similar to the first capture location, wherein the second capture location similar to the first capture location is a location within a certain pre-established distance of the first capture location, and wherein the second field of view similar to the first field of view includes a horizontal component within a pre-established angle of a horizontal component of the first field of view and includes a vertical component within a pre-established angle of a vertical component of the first field of view;

adjusting light parameters of the image of the subject based on the light parameters of the second image; and generating a combined image based on the second image and the image of the subject, the combined image including at least part of the second image, and the adjusted image of the subject at a position in the scene similar to the first position in the scene.

2. The method of claim 1, wherein the first image includes a computational image.

3. The method of claim 1, wherein acquiring the second image from the repository storing a plurality of images comprises selecting an image having a highest user rating from the plurality of images, wherein one or more images in the plurality of images is associated with a respective user rating.

4. The method of claim 1, wherein acquiring the second image comprises selecting an image from the plurality of images according to a user profile, wherein the user profile indicates preferred image attributes, the image attributes including one or more of color parameters and time of image capture.

5. The method of claim 1, wherein acquiring the second image comprises selecting an image from the plurality of images based on a date of image capture and a weather history at the second capture location at the date of image capture.

6. The method of claim 1, wherein acquiring the second image comprises receiving a user selection of the second image from two or more images of the plurality of images presented to the user, the two or more images each having a field of view similar to the first field of view and a capture location similar to the first capture location.

7. The method of claim 1, wherein the second image is acquired based at least in part on one or more of an image signature, image metadata, an angular orientation of a respective image capture device, spectral reflectance of objects in the image, weather history at the capture location, time of image capture, image histogram, image resolution, user rating, color histogram, user preferences, illumination intensity, and distance information of objects in the image.

8. The method of claim 1, wherein adjusting light parameters of the image of the subject includes adjusting one or more colors of the image of the subject and adjusting a light direction of light on the subject.

9. The method of claim 8, wherein adjusting one or more colors of the image of the subject includes estimating a spectral reflectance of the subject and relighting the image of the subject based on spectral power distribution and lighting geometry.

10. A computing device for generating an image, the device comprising:

a computer-readable medium;

one or more processors coupled to the computer-readable medium and configured to cause the computing device to determine scene information based on a first image of a scene, the first image including an image of a subject at a first position in the scene, and the first image information including a first field of view of the first image and a first capture location where the first image was captured;

acquire a second image of the scene from a repository storing a plurality of images based on the scene information, the second image having a second field of view similar to the first field of view and a second capture location similar to the first capture location, wherein the second capture location similar to the first capture location is a location within a certain pre-established distance of the first capture location, and wherein the second field of view similar to the first field of view includes a horizontal component within a pre-established angle of a horizontal component of the first field of view and includes a vertical component within a pre-established angle of a vertical component of the first field of view;

adjust light parameters of the image of the subject based on the light parameters of the second image; and generate a combined image based on the second image and the image of the subject, the combined image including at least part of the second image, and the adjusted image of the subject at a position in the scene similar to the first position in the scene.

11. One or more non-transitory computer-readable media storing instructions that, when executed by one or more computing devices, cause the computing devices to perform operations comprising:

determining scene information based on a first image of a scene, the first image including an image of a subject at a first position in the scene, and the first image information including a first field of view of the first image and a first capture location where the first image was captured;

acquiring a second image of the scene from a repository storing a plurality of images based on the scene information, the second image having a second field of view similar to the first field of view and a second capture location similar to the first capture location, wherein the second capture location similar to the first capture location is a location within a certain pre-established distance of the first capture location, and wherein the second field of view similar to the first field of view includes a horizontal component within a pre-established angle of a horizontal component of the first field of view and includes a vertical component within a pre-established angle of a vertical component of the first field of view;

adjusting light parameters of the image of the subject based on the light parameters of the second image; and generating a combined image based on the second image and the image of the subject, the combined image including at least part of the second image, and the adjusted image of the subject at a position in the scene similar to the first position in the scene.

* * * * *